Sept. 1, 1931.  E. L. MASTERS  1,821,187
PLANT SETTER
Filed Jan. 3, 1928
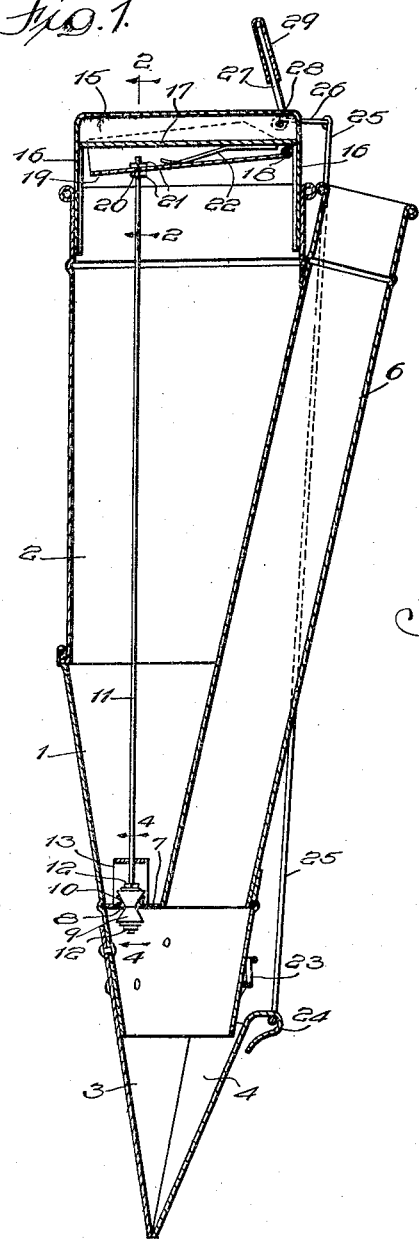
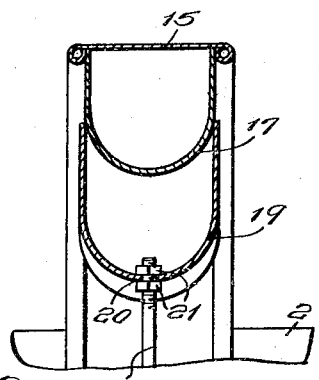
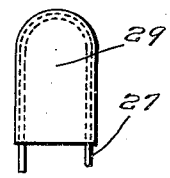
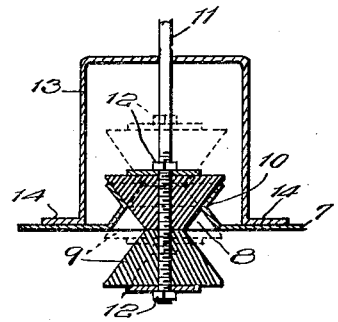
Witness:
William P. Kilroy
Inventor:
Edwin L. Masters
By Hill & Hill
Attys.

Patented Sept. 1, 1931

1,821,187

UNITED STATES PATENT OFFICE

EDWIN L. MASTERS, OF CHICAGO, ILLINOIS

PLANT SETTER

Application filed January 3, 1928. Serial No. 244,265.

This invention relates to the general class of devices known as plant setters, and particularly to a device for setting and planting tobacco, cabbage, tomato and similar plants that are usually first grown in beds and later transplanted and set in the field for further development.

The invention is particularly an improvement upon the device disclosed in Patent Number 1,120,211 dated December 8, 1914.

In the device disclosed in the patent cited, the means for operating the valve for discharging water or fertilizing liquid on the plant during the planting operation is operable by the thumb. Same is also true of the means for operating the pivoted shovel. Persons using the device disclosed in the cited patent have experienced a great deal of fatigue in the hand used to operate the device and particularly in the thumb thereof due to the successive use of the same. This not only causes a great deal of discomfort to the operator, but oftentimes makes it necessary for the operator to stop using the device until he has recovered from the fatigue and consequent soreness.

An object of applicant's invention, therefore, is the production of valve operating means operable by the fingers, and particularly by the grip of the hand. Another object of applicant's invention is the production of novel valve means, said valve being capable of measuring more or less equal amounts. A further object of applicant's invention is the production of a novel means for operating the pivoted shovel. A further object of applicant's invention is the production of a device of low cost, simple in construction, readily manufactured, durable and operable under all kinds of conditions and highly satisfactory for its intended purpose.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 1 is a sectional elevation through a plant setter;

Fig. 2 is a section on line 2—2 of Fig. 1;

Fig. 3 is a detail of the operating arm of the bell-crank; and

Fig. 4 is a section on line 4—4 of Fig. 1.

Referring to the drawings, 1 and 2 are casings connected to form a water reservoir adapted to accommodate a considerable quantity of water and also to make the same of convenient height or length when carried. Secured to the lower end of part 1 is a stationary shovel 3 and a pivoted shovel 4 cooperating therewith.

Extending to the interior of the part 1 and arranged to discharge between the shovels is a plant tube 6 which is preferably open at the bottom at or near the partition 7 which forms the bottom of the water reservoir. At the bottom of the reservoir is a discharge opening or outlet 8 which is controlled by a double faced valve member 9. The valve member 9 is preferably formed of two frusto-conical members with their smaller plane faces abutting as shown in Fig. 1. The opening 8 is formed with a double frusto-conical face as shown at 10 to conform to the contour of the valve member 9 and to cooperate therewith in forming a closure member for the bottom of the water reservoir.

The valve member 9 is attached to an operating rod 11 preferably by burrs 12 threaded on rod 11. The rod 11 has a guide 13 adjacent the opening 8 and is shown composed of a substantially U-shaped member attached to the bottom 7 of the reservoir by flanges 14. At the upper part of the reservoir is arranged a carrying handle 15, the ends of which are extended down at 16 for attachment to the casing 2. The handle portion 15 has its under part rounded as shown at 17 in Fig. 2.

Pivoted adjacent one end of the rounded portion 17, as at 18, is a rod actuating member 19 formed more or less U-shaped as shown in cross section in Fig. 2 and arranged to slide over the handle 15. Rod 11 is attached to the actuating member 19 at 20 preferably by means of burrs 21 threaded on rod 1 or any other suitable means. Member 19, together with rod 11, is urged downward to close the opening 8 by means of the spring 22 secured to the under part 17 of handle 15 and slidably engaging the inner surface of the U-shaped rod actuating member 19, as clearly shown in Fig. 1. It is readily seen that either an upward or a downward movement of the valve member 9 from one position to the other will allow a slight amount of liquid to escape through the opening 8.

The pivoted shovel 4 is normally maintained in the position shown in Fig. 1 by a resilient member partly shown at 23, and not forming a part of this invention. The shovel 4 is provided with a portion 24 to which the operating rod 25 is connected. Operating rod 25 is operated by bell-crank 26—27 pivoted at 28 on the handle 15. The arm 26 of the bell-crank is attached to the rod 25. The arm 27 is composed of a loop as clearly shown in Fig. 3. The loop portion is covered with a sheet of material, preferably metal, as clearly shown in Figs. 1 and 3, thus forming a convenient seat for the thumb. This addition to the loop 27 is highly effective for its intended purpose and relieves the strain on the thumb during the operation of the device.

It is readily seen that with applicant's novel arrangement and combination of parts, 50% of the movements of the thumb are eliminated by means of the novel valve means operable by the fingers instead of the thumb.

The operation of the device is as follows: The device is grasped by the hand in a natural manner, the fingers encircling the handle 15 and extending around the hinged valve actuating member 19. The member 19 and rod 11 are thus drawn upwardly so that the lower frusto-conical portion of the valve is drawn up to its seat and a slight amount of liquid is allowed to pass therethrough. The device may now be carried to any desired point without the loss of any liquid. In setting the plant, the operator presses downward upon the handle 15 so as to force the shovels into the ground to the desired depth. The grip on the member 19 may now be released, which allows the valve member 9 to move downward and during this motion a small quantity of liquid is discharged through the opening 8. The plant is then dropped down through the plant tube 6 and enters the space between the shovels 3 and 4. The operator then presses downward on the arm 27, thus opening the jaws as the setter is being withdrawn from the ground. At approximately the same time he renews his grip on the handle 15 together with the rod actuating member 19, thus drawing the valve 9 upward to again close the opening 8 and allowing a small amount of liquid to pass through. The plant will be left in the ground at the bottom of the hole and the operator can then kick the dirt on top of the root of the watered plant if necessary or desired, or can cover the plant root by giving the setter a slight turn, thus causing the shovels to scoop in dirt enough to cover the root of the plant. The rod actuating member 19 is operated by the fingers of the hand and can be operated by any one of the fingers or any number of them as desired. It is readily seen that a highly efficient device has been produced, satisfactory for its intended purpose.

The operation of the valve becomes practically automatic in the use of the plant setter inasmuch as the person operating same becomes accustomed to performing the same series of movements in the setting of each plant. The valve measures and dispenses practically equal amounts of liquid inasmuch as the operator generally operates the valve member at the same rate of speed. The closure portions of the valve member may be adjusted if desirable to accommodate a swift or slow movement of the valve member by the operator. This can be done by changing the length of the cones and if necessary the diameters of the bases of same. The operator has absolute control of the liquid and if desirable can maintain a grip on the handle at all times, releasing same to dispense liquid whenever desired. With applicant's novel handle and valve operating means partially enclosing same, there is no pinching of the fingers during the operation of the valve member nor can any foreign substance find its way between the valve operating member and the handle itself.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a plant setter of the kind described, a reservoir having a discharge opening in the lower end thereof, a valve member for said discharge opening, said valve member having a closure portion on each side of said discharge opening, means for carrying said plant setter, and means adjacent said last mentioned means and operable by the natural grasping and releasing thereof for operating said valve member.

2. In a plant setter of the kind described, a reservoir having a valved opening in the lower end thereof, means for carrying said plant setter, and valve operating means adjacent said last-mentioned means and operable by the fingers in the operation of said plant setter by the natural grasping and releasing of said carrying means for opening and closing said valved opening when said operating means is moved in either direction.

3. In a plant setter of the kind described, a reservoir having an opening in the lower end thereof, a valve member having a closure portion operable in a plurality of directions for closing said opening, means for carrying said plant setter, and means adjacent said last-mentioned means and operable simultaneously therewith by the fingers of the same hand in gripping and releasing both of said means for operating said valve member whereby said valve member is closed when said means are gripped or released and said valve member is open to allow passage of fluid when in intermediate positions.

4. In a plant setter of the kind described, means for operating a valve member therefor, said means comprising a U-shaped member partially enclosing said handle, means for connecting said U-shaped member and said valve, and resilient means for closing said valve.

5. In a plant setter of the kind described comprising a handle, a reservoir having an opening therein, a valve member movable in a plurality of directions for closing said opening when moved in either direction, means for operating said valve member, said means comprising a pivoted member adapted to be actuated by the fingers in partially enclosing said handle, and resilient means for urging said valve member in one direction to close said opening.

6. In a plant setter of the kind described, a reservoir having a discharge opening, a closure face on each side of said discharge opening, a double-faced valve member for opening and closing said discharge opening and movable to engage said closure faces, said valve member composed of two frusto-conical portions with their smaller bases adjacent each other.

7. In a plant setter of the kind described, a reservoir having a discharge opening in the lower end thereof, means for discharging substantially equal quantities of liquid comprising a valve member for said discharge opening, said valve member having a closure portion on each side of said discharge opening, means for carrying said plant setter, and means adjacent said last-mentioned means and operable by the grasping and releasing thereof for operating said valve member.

8. In a plant setter of the kind described, a reservoir having a discharge opening in the lower end thereof, a pair of separable tapering shovels attached to said reservoir, a plant tube secured to said reservoir and adapted to discharge between said shovels, a valve member for said discharge opening, said valve member having a closure face on each side of said discharge opening and cooperating therewith, a handle on said plant setter, and a member adjacent said handle and operable simultaneously therewith by the fingers of the same hand for operating said valve.

9. In a plant setter of the kind described and in combination, a fluid reservoir having a discharge opening in the lower end thereof, a pair of shovels secured to said reservoir, one of said shovels movable relative to the other, means for normally maintaining said shovels in closed position, a plant tube secured to said reservoir and extending thereinto with its discharge opening below the lower end of said reservoir, a handle at the top of said reservoir, means adjacent said handle for operating said movable shovel, a valve member having a closure face on each side of said discharge opening, means about said discharge opening and cooperating with said faces on said valve member for controlling the flow through said discharge opening, and means adjacent said handle and operable by the grip of the hand on said handle for operating said valve member to uncover and cover said discharge opening when said last mentioned means is moved in either direction.

10. In a plant setter of the kind described, a reservoir having a discharge opening adjacent the lower end thereof, a plurality of valve seats disposed at said discharge opening, a double faced valve member for opening and closing said discharge opening and movable to engage said seats in a plurality of positions, a handle for manipulating said setter and a lever pivoted to said handle and engageable by the hand in grasping and releasing said handle for moving said valve to one of its extreme positions, resilient means for normally actuating said lever so as to move said valve to the other of its extreme positions, said valve being open at a point intermediate of its extreme positions.

In testimony whereof I have hereunto signed my name.

EDWIN L. MASTERS.